Oct. 15, 1968  P. L. FINELLI  3,405,621

FILM METERING DEVICE WITH TWO LOCKING MEMBERS

Filed Feb. 11, 1966  4 Sheets-Sheet 1

INVENTOR.
Patrick L. Finelli

BY Brown and Mikulka
and
Robert E. Corb
ATTORNEYS

United States Patent Office 3,405,621
Patented Oct. 15, 1968

3,405,621
FILM METERING DEVICE WITH TWO
LOCKING MEMBERS
Patrick L. Finelli, Sudbury, Mass., assignor to Polaroid
Corporation, Cambridge, Mass., a corporation of
Delaware
Filed Feb. 11, 1966, Ser. No. 526,752
7 Claims. (Cl. 95—31)

This invention relates to photographic apparatus such as a camera for exposing successive areas of a photosensitive sheet and processing the exposed areas by advancing them in superposition with areas of a second sheet between a pair of pressure-applying members to distribute a liquid processing composition between the sheets to form a sandwich and withdrawing the sandwich as it is formed directly from the camera; and particularly, to novel and improved indexing mechanisms for controlling the movement of the sheets through and from the camera.

In the copending U.S. patent application of Otto E. Wolff, Ser. No. 409,070, filed Nov. 5, 1964, now U.S. Patent No. 3,289,559, issued Dec. 6, 1966, there is shown and described a camera of the self-developing type including a two-section housing for holding and enclosing a roll film assembly comprising an elongated photosensitive image-recording sheet coupled at its leading end with a second or image-receiving sheet having a plurality of rupturable containers of processing liquid mounted thereon; means for locating for exposure and exposing successive areas of the photosensitive sheet; a pair of juxtaposed pressure-applying members for superposing each exposed area of the image-recording sheet with an area of the second sheet and distributing the processing liquid from one of the containers between the areas of the sheets to form a sandwich; an opening adjacent the pressure-applying members through which the sandwich is withdrawn directly from the camera; and means for preventing admission of light into the camera through the sheet withdrawal opening, severing successive portions of the sandwich withdrawn through the opening and controlling movement of the sheets through and from the camera. The indexing mechanism includes engagement means for engaging successive portions of the sheets during movement thereof through the camera, and the sheet-severing means cooperate with the engagement means for controlling movement of the sheets through the camera and are so constructed and arranged as to be operated manually as a necessary part of the process of manual withdrawal of the sheets.

The arresting mechanism includes a sheet-engagement member mounted for movement by and in response to engagement with successive portions of one of the sheets, and an arresting member located in the path of movement of a projection on the engagement member for arresting movement of the engagement member and the sheets. The means for severing the sheets and light-sealing the withdrawal opening include a member movable manually from an operative position in which it functions to cut the sheets and light-seal the withdrawal opening to an inoperative position and is coupled with the arresting member for disengaging the latter from the engagement member to permit continued movement of the sheets in response to movement into an inoperative position. As the engagement member is released for movement, the arresting member should be positioned to again engage a projection on the engagement member and arrest movement of the sheets at the proper time.

An object of the invention is to provide an arresting mechanism of the type described including means enabling the operator to release the sheets for movement while making it impossible for the operator to render the arresting mechanism inoperative to arrest movement of the sheets.

The indexing mechanism includes a sheet-severing and light-sealing member manually movable from an operative to a release position and most effective to prevent admission of light into the withdrawal opening when in its operative position. Accordingly, the sheet-severing and light-sealing member (and the arresting member with which it is coupled), is spring biased so as to return automatically to its operative position from its release position.

Another object of the invention is to provide, in an arresting mechanism of the type described, means for coupling the manually movable sheet-severing and light-sealing member with the arresting member in such a way as to permit the former to return to its operative position even though the arresting member is restrained from returning to the position in which it is normally operative to arrest movement of the engagement member and sheets.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
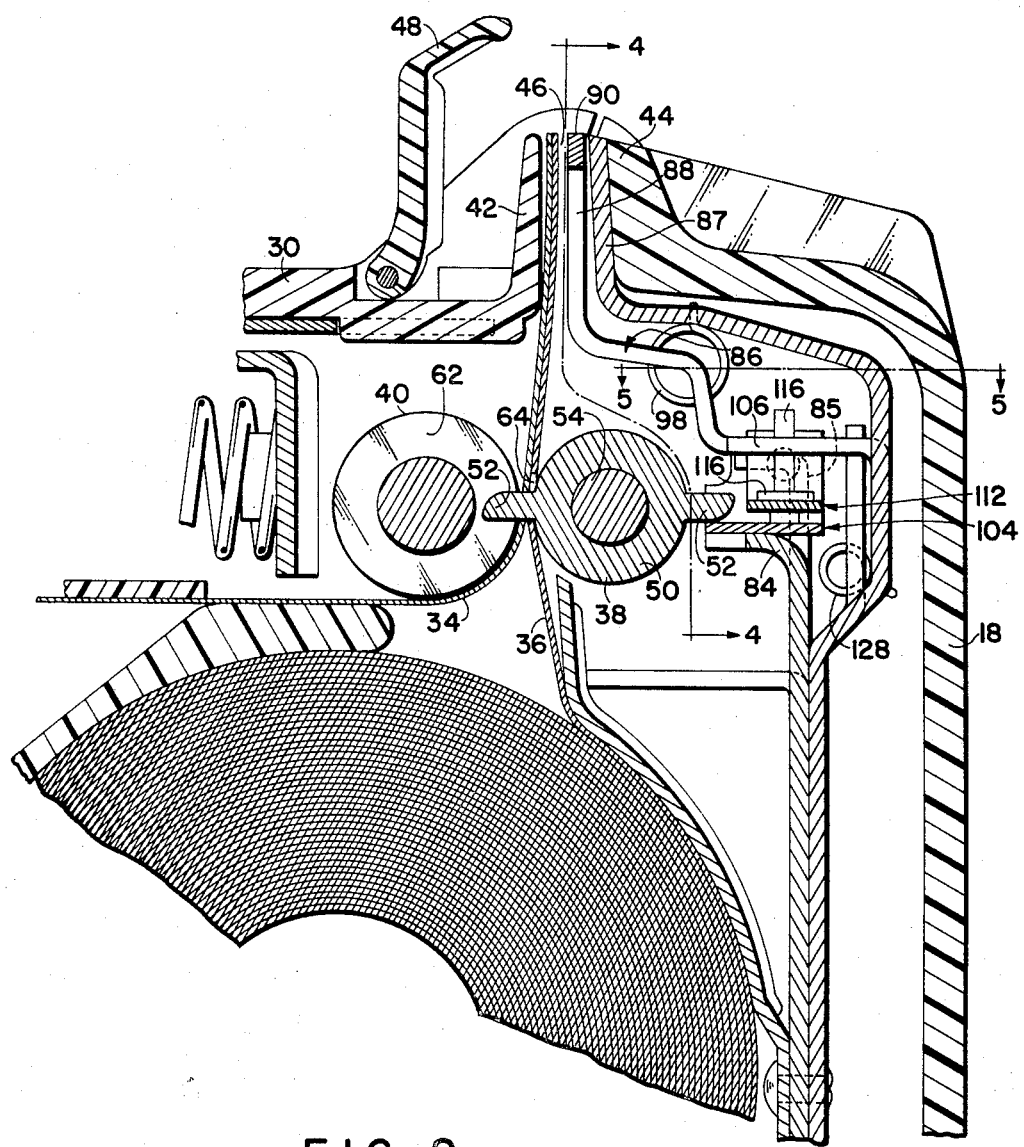
FIG. 2 is a partial sectional view of the camera.
Figure 3:
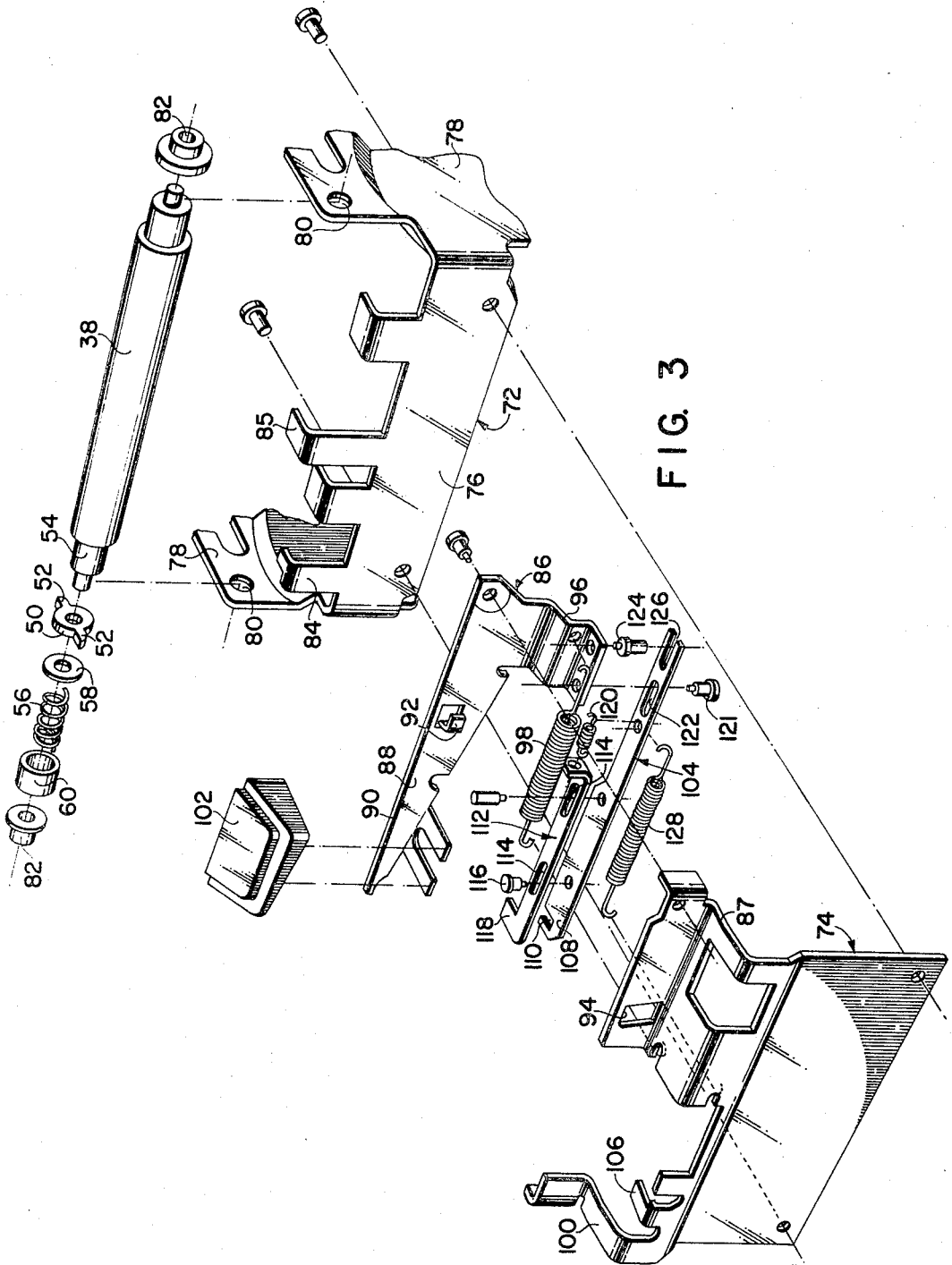
FIG. 3 is an exploded perspective view of the arresting mechanism of the invention.
Figure 4:
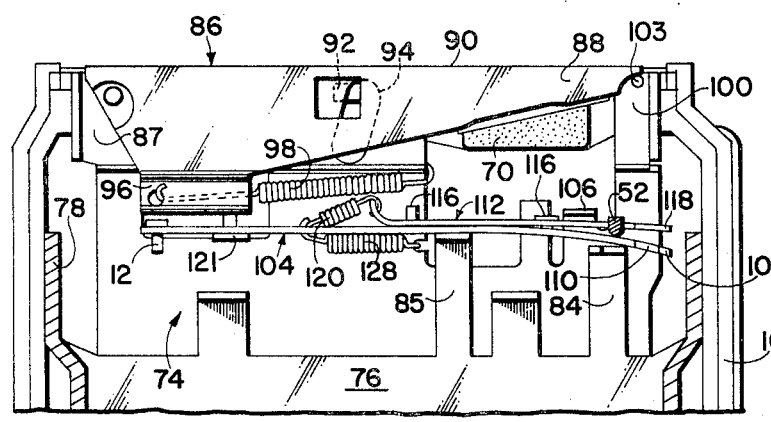
FIG. 4 is a fragmentary sectional view taken substantially along the line 4—4 of FIG. 2, showing the operation of the arresting mechanism.
Figure 5:
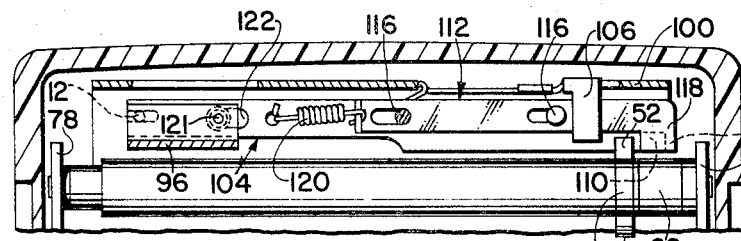
Figure 6:
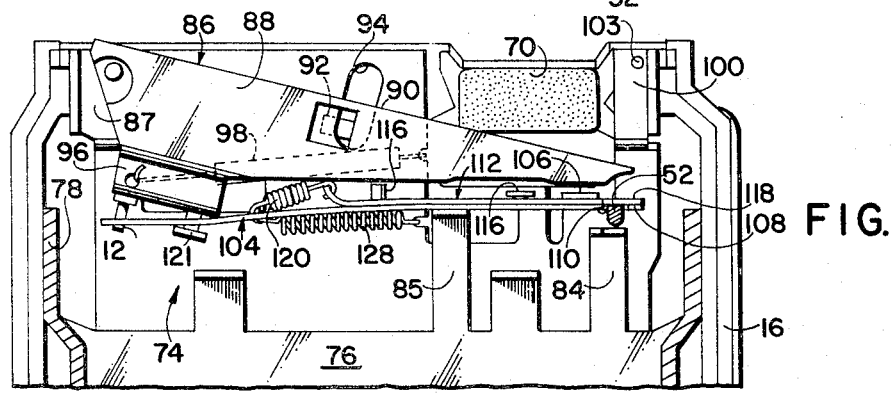
Figure 7:
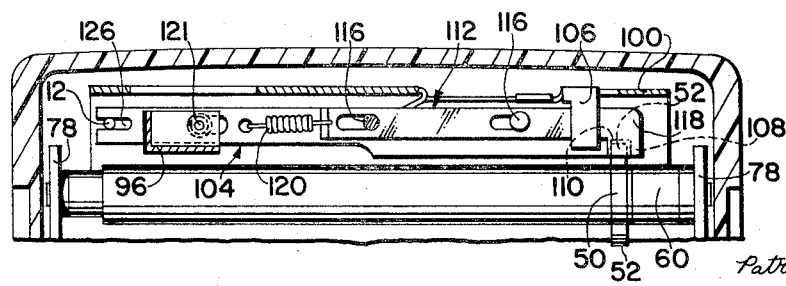

FIG. 5 is a sectional view taken substantially along the line 5—5 of FIG. 2; and FIGS. 6 and 7 are views similar to FIGS. 4 and 5, respectively, showing the arresting mechanism in another position thereof to illustrate its operation.

Figure 1:
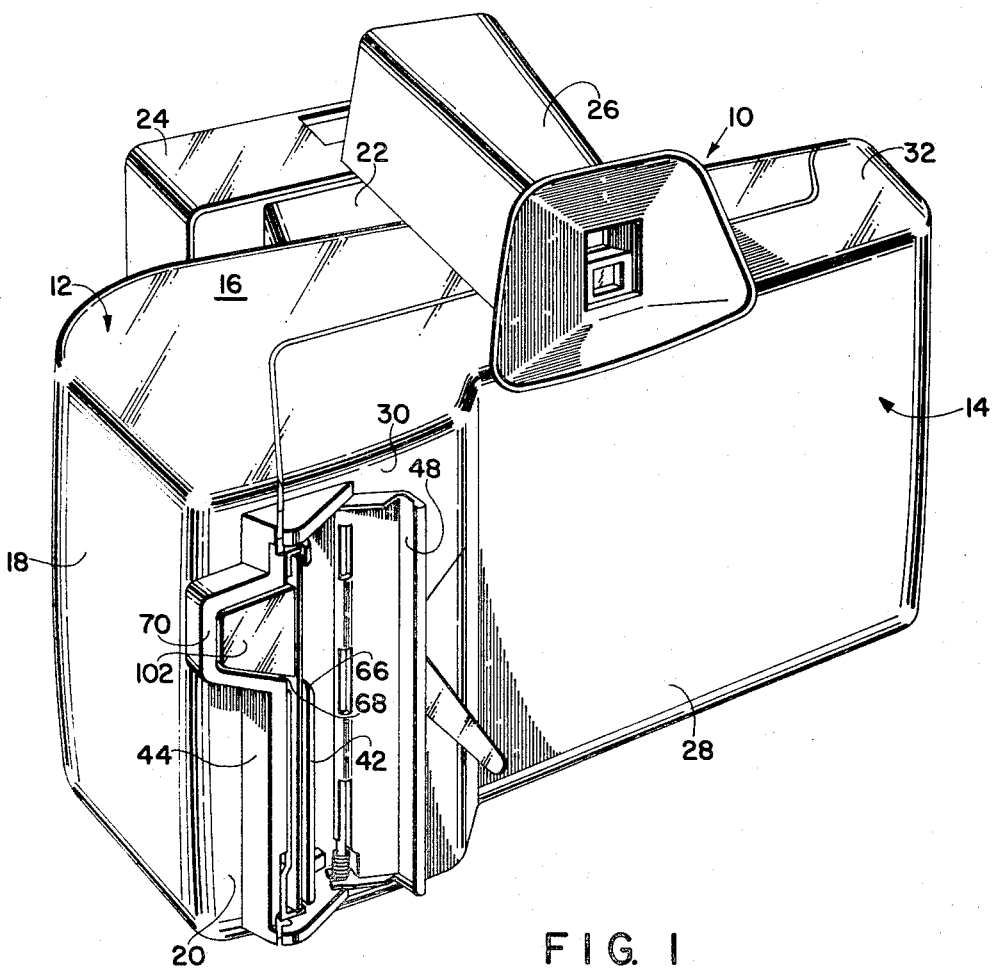
FIGURE 1 is a rear perspective view of a camera embodying the invention.

Reference is now made to FIGS. 1 and 2 of the drawings wherein there is illustrated a camera 10 of the type embodying the present invention, comprising a housing including a forward section 12 and a rear section 14, pivotally connected at one end for movement with respect to one another between the operative or closed position (shown) and an open position to permit loading of a film assemblage into the housing. The forward housing section includes a main body portion comprising an upper wall 16, an end wall 18, a relatively short rear wall 20, and a lower wall, forward wall, and a wall at its opposite end, which are not visible in the drawings. Extending from the main body portion of the housing section is an extended section 22 on which is mounted a conventional lens and shutter assembly 24. A viewfinder 26 is mounted on upper wall 16. Rear housing section 14 comprises a rear wall including a first panel 28 and a rearwardly displaced second panel 30, an upper wall 32 and a lower wall and end walls which do not appear in the drawings. The upper and lower walls of the rear housing section overlap, respectively, portions of the upper and lower walls in the forward housing section to light-seal the camera housing. The forward and rear housing sections cooperate to provide a chamber at one end of the camera housing for holding a supply of a photosensitive image-recording sheet, designated 34, an intermediate chamber including means for supporting successive areas of the image-recording sheet in position for exposure, and a chamber adjacent end wall 18 for holding a coil of a second or image-receiving sheet 36.

The processing mechanism of the camera comprises a pair of juxtaposed pressure-applying rolls 38 and 40 mounted, respectively, on the forward and rear housing sections so as to be separated when the housing sections are pivoted into an open position to permit threading of the image-recording and second sheets between the pressure-applying rolls. Roll 40 is biased by a suitable spring toward roll 38 in order to apply compressive pressure to the sheets and each of the rolls includes at least a cylindrical medial portion, is mounted with its axis substantialy in the same plane as the axis of the other roll and cooperates therewith to define a convergent passage into which the sheets are advanced into superposition along convergent paths.

Rear wall 20 of forward housing section 12, and panel 30 of rear housing section 14, include adjacent portions cooperating to define an opening aligned with the passage between rolls 38 and 40 and through which the sandwich comprising sheets 34 and 36 is withdrawn from between the pressure-applying rolls. The forward and rear housing sections include means for preventing the admission of light through this opening into the interior of the camera housing and in the form shown, these means comprise a rearwardly projecting lip 42 on panel 30 located at the end of the panel extending from side to side thereof, and having a length slightly exceeding the width of the sheets; and a second lip 44 extending rearwardly adjacent lip 42 from rear wall 20 of the forward housing section. Lips 42 and 44 include end portions which cooperate with the lips to define a narrow passage 46 extending rearwardly from the camera housing and through which the sandwich, comprising sheets 34 and 36, can be withdrawn. Passage 46 defined by lips 42 and 44 and the end portions thereof, is only slightly wider than the maximum thickness of the sandwich and is inclined and oriented so that light passing through the passage impinges upon and is blocked by roll 38. Sheets 34 and 36, being opaque in order to permit their withdrawal from the camera during processing, also help to prevent admission of light through the passage by blocking reflection of light from roll 38 to other parts of the interior of the camera at which light might possibly expose the image-recording sheets. As an added precaution against exposure of the image-recording sheet to light admitted through passage 46, a cover member 48 is mounted for movement on panel 30 from a closed position in which it extends across the passage to the open position shown in FIGS. 1 and 2, at which it is located to one side of the passage to permit withdrawal movement of the sheet materials through the passage. Cover member 48 is preferably spring biased into its closed position.

Following exposure, the exposed area of image-recording sheet 34 is advanced into superposition with an area of second sheet 36 between rolls 38 and 40 and moved from the rolls through passage 46 from the camera. During this movement, processing liquid contained in a rupturable container located between the sheets near the leading edge of the juxtaposed areas of the sheets is distributed between and in contact with the sheets; and the next succeeding unexposed area of the image-recording sheet is moved into position for exposure. The indexing mechanism of the camera is designed to arrest the movement of the sheets when the exposed and processed area of the image-recording sheet has been advanced from the camera through passage 46, and the next succeeding unexposed area of the image-recording sheet is in position for exposure. This arresting or indexing mechanism comprises a sheet engaging member in the form of a disc 50 having a pair of radial projections 52, mounted coaxially with roll 38 on a shaft 54 extending from one end of the medial portion of the roll. Disc 50 is rotatable independently of roll 38 and is biased into frictional engagement with the end of the medial portion of the roll by a coil spring 56 engaged around shaft 54 and acting against a washer 58 located between the spring and disc. The diameter of disc 50 is approximately equal to the diameter of the medial portion of the roll 38, and a sleeve 60 having an outer diameter also approximately equal to that of the medial portion of the roll is provided around spring 56 to aid in preventing the admission of light into the camera past the end of the medial portion of roll 38. The medial portion of roll 40 is provided near one end with a peripheral groove 62 for accommodating radial projections 52 to permit rotation of both rolls and disc 50.

Image-receiving sheet 36 is provided along one edge with a succession of openings 64, each opening being associated with an area of the image-receiving sheet adapted to be superposed with an exposed area of the image-recording sheet during processing thereof. Openings 64 in the image-receiving sheet are aligned with disc 50 during movement of the sheets between the rolls and frictional coupling between roll 38 and the disc causes the disc to rotate (in a clockwise direction viewing FIG. 2) until one of projections 52 rides against the outer surface of sheet 36. Sheet 36 is moved until an opening 64 becomes aligned with the projection 52 bearing against the sheet and the projection enters the opening and is engaged by the trailing edge of the opening thereby rotating the disc slightly causing the projection to punch a hole in the underlying portion of sheet 34 and enter groove 62 in roll 40. Movement of the sheets is arrested by arresting rotation of disc 50 with a projection 52 engaged in an opening 64 in sheet 36 and the hole punched in sheet 34. Movement of the sheets is recommenced by again permitting disc 50 to rotate as the sheets are withdrawn between the rolls whereupon disc 50 again rotates due to frictional coupling with roll 38 until a projection 52 comes to bear against sheet 36. Movement of the sheets is continued with the projection bearing against sheet 36 until an opening 64 becomes aligned with the projection, the projection enters the opening and is carried into the bite of the rolls to the position shown in FIG. 2 in which movement of the sheets is arrested by arresting rotation of disc 50.

The sandwich comprising sheets 34 and 36 is withdrawn between the rolls and from the camera manually, and in order to permit portions of the sheets located between lips 42 and 44 to be grasped, the lips are formed with aligned indentations including indentation 66 in lip 42, and indentation 68 in lip 44, the latter including a re entrant section 70 providing a recess for holding a component to be described hereinafter. The indentations in the lips provide room for the operator to grip the sandwich between a thumb and finger for withdrawing it through the passage. Following withdrawal of a portion of the sandwich comprising an exposed area of the image-recording sheet, movement of the sandwich is arrested and the portion of the sandwich projecting beyond the rear edges of the lips is severed from the remainder of the sandwich within this passage along a transverse line corresponding approximately with the edges of the lips. The camera includes a manually movable sheet-severing member for facilitating severance of the sandwich and preventing admission of light through passage 46, and particularly, the indentation in lip 44.

The sheet-severing member, roll 38, and the indexing mechanism are mounted on a chassis comprising a first frame 72 and a second frame 74, each designed to be formed of sheet metal. Frame 72 comprises a transverse section 76 and two dependent end sections 78 including holes 80 for bushings 82 in which roll 38 is journaled. Extending rearwardly from transverse section 76 are a pair of L-shaped support members 84 and 85 having end portions extending toward roll 38. Second frame 74 is mounted on transverse section 76 of frame 72 and includes a support member 87 having a medial portion extending rearwardly and then adjacent rear wall 20 toward passage 46 and an end portion extending rearwardly within the passage adjacent lip 44.

The sheet-severing and light-sealing member is designated 86 and comprises a cutter bar 88 pivotally mounted at one end on support member 87 within passage 46 and extending within the passage to the opposite side thereof. Cutter bar 88 includes a sharpened straight edge 90 aligned in the operative position of the cutter bar substantially with the rear edges of the lips, and providing means against which the sandwich may be drawn for severing the sheets. The cutter bar is formed with an ear 92 that extends into and cooperates with an opening 94 in the end portion of support member 87 within passage 46 for limiting the pivotal movement of the cutter bar and defining the operative position thereof. Member 86 includes an arm 96 extending inwardly and rearwardly from the end of member 86 at which the latter is mounted and a coil spring 98 is engaged between support member 87 and an arm 96 for biasing the cutter bar into its operative position shown in FIG. 4. To prevent movement of the cutter bar during severance of a sheet against the cutter bar an arm 100 is provided on second frame 74 and includes an end section extending rearwardly within passage 46 adjacent the free end of the cutter bar. A raised dimple 103 is provided on the surface of the end portion of arm 100 facing the cutter bar for engaging the free end of the cutter bar and preventing pivotal movement thereof. A button 102 is mounted on cutter bar 88 within the recess provided by re-entrant section 70 of lip 44. Button 102 is adapted to be engaged and depressed by the operator in order to grasp the sandwich between the lips, and pressure against the inclined face of the button causes a slight deformation of the cutter bar toward lip 42, disengaging the cutter bar from dimple 103 and permitting the inward (forward) movement of the cutter bar from its operative position.

The means for arresting rotation of disc 50 comprise an elongated arresting member 104 in the form of a resilient strip or cantilever spring attached at one end to arm 96 and extending from side to side of the camera generally parallel with the axis of roll 38. Arresting member 104 is supported for movement lengthwise intermediate its ends on support member 85 and the free end portion is located between support member 84 and an L-shaped support member 106 extending rearwardly and toward roll 38 from second frame 74. The free end portion of arresting member 104 is thus deformable to a limited extent between the confines of support members 84 and 106 in a plane generally parallel with the plane of movement of the sheets between the pressure-applying rolls. The free end section, designated 108, of arresting member 104 is located in the path of rotation of projections 52 on disc 50 and is located in position to engage one of projections 52 to arrest movement of the disc (as shown in FIGS. 2, 4 and 5) when the other projection on the disc is engaged in openings in the sheets within the bite of the pressure-applying rolls. As disc 50 is rotated by engagement with the sheets, it deflects free end section 108 of arresting member 104 toward and against support member 84 (see FIG. 4) thereby arresting rotation of the disc. To release disc 50 for continued rotation, the free end section of arresting member 104 is formed with an indentation or notch 110 dimensioned to allow the passage of a projection 52 therethrough, and the construction and coupling of sheet-severing and light-sealing member 86 and arresting member 104 are such that when member 86 is pivoted inwardly, as shown in FIGS. 6 and 7, arresting member 104 is moved lengthwise (to the left in the drawings) until notch 110 is aligned with projection 52 allowing the free end section of the support member to return to its undeformed position (see FIG. 6) behind the projection with which it was engaged so that when the sheet-severing member is released, the arresting member is free to move lengthwise into its initial position in readiness to engage the other projection on disc 50 and arrest the rotation of the disc when the latter becomes engaged in the next opening 64 in sheet 36.

As previously noted, it may be possible for the operator to retain sheet-severing member 86 (cutter bar 88) in a position such that notch 110 is held in alignment with projections 52 and thereby render the indexing mechanism inoperative to arrest movement of the sheets while withdrawing the sheets from the camera. As a safety measure to prevent this from occurring, a second arresting member 112 formed of a resilient strip material is mounted on arresting member 104 for limited lengthwise sliding movement relative to the latter. For this purpose, the second arresting member is formed with lengthwise slots engaged around studs 116 secured to arresting member 104. The major portion of the second arresting member is disposed out of the path of movement of projections 52 and the second arresting member includes an end section 118, normally overlying notch 110 in arresting member 104, a spring 120 secured between members 104 and 112 being provided for this purpose. In the operation of the device, when a projection 52 deflects the free end section of arresting member 104 against support member 84 (FIG. 4) the end portion of second arresting member 112 is deflected only slightly (see FIG. 5) and is located to the side of projection 52 opposite arm 96 of sheet-severing member 86 so that when the latter is pivoted to move arresting member 104 lengthwise and align notch 110 with projection 52, second arresting member 112 is prevented by the projection from moving lengthwise under the bias of spring 120. When notch 110 becomes aligned with projection 52, the end sections of both arresting members return in a direction opposite to the direction of movement of the projection to their original positions prior to deflection, i.e., against the support member 106, thereby permitting the second arresting member to move (to the left) under the bias of spring 120 until end section 118 of the second arresting member is aligned with notch 110 in the end section of arresting member 104 in readiness to engage the other projection 52 and arrest the rotation of disc 50, even though notch 110 may be retained in alignment with the path of rotation of the projections (as shown in FIGS. 6 and 7).

Although unlikely, it may be possible to engage a projection 52 within notch 110 and/or against the side of end section 118 in such a way that the arresting members are prevented from moving lengthwise (to the right) to their initial positions due to the bias of spring 98. Since the light-sealing function of member 86 is impaired while the member is in its pivoted (inward) position, the coupling between arm 96 of member 86 and arresting member 104 is such as to permit the sheet-severing and light-sealing member to return under the bias of spring 98 to its initial position even though arresting member 104 is restrained in its displaced or release position. This coupling includes a stud 121 mounted on arm 96 and engaged for limited movement in a slot 122 in arresting member 104 to permit limited lengthwise movement of the arresting member relative to arm 96. A second stud 124 mounted on arm 96 is engaged in second slot 126 in the end of arresting member 104 to prevent pivotal movement of the arresting member about stud 121. A spring 128 is coupled at its ends with arresting member 104 and support member 87 of frame 74 for returning arresting member 104 to its initial arresting position independently of the return movement of the sheet-severing and light-sealing member to its initial operative position.

The arresting mechanism of the invention is of the type adapted to engage in successive portions of a sheet during movement thereof through the camera to arrest movement of the sheet at predetermined positions thereof; and control over the operation of the indexing mechanism, particularly release of the sheet for movement, is manual and of necessity must be accomplished as a part of another operation involved in using the camera. The improved construction which constitutes the invention provides a "fail safe" feature which insures that despite any failure of the mechanism to function properly due to the action of the camera operator, film will not be wasted due to uninterrupted movement thereof through and from the camera. The manually operable release performs the additional functions of severing the sheet and light-sealing an opening in the camera through which the sheet is moved, and the invention comprehends a construction enabling the sheet-severing and light-sealing (manual release) component of the indexing mechanism to operate independently of the sheet-engaging and arresting component, at least to an extent sufficient to insure performance of their individual functions even though not performing their conjoint functions.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including an engagement member for engaging successive portions of a photographic sheet to arrest movement of said sheet through said apparatus, said engagement member including a projecting section movable along a predetermined path in response to movement of said sheet in engagement with said member, means for controlling the movement of said engagement member comprising, in combination:
   a first resilient, elongated arresting member mounted in an initial position with an end section of said member extending across said path of movement of said projecting section of said engagement member, said end section of said first arresting member being deformable in the direction of movement of said projecting section by and in response to engagement with said projecting section;
   means for limiting deformation of said end section to arrest movement of said engagement member; said end section including a recessed portion;
   release means for moving said arresting member lengthwise from said initial position to align said recessed portion with said projecting section and disengage said arresting member from said projecting section permitting said end section of said arresting member to return to its initial position;
   a second arresting member mounted on said arresting member for limited movement relative to and lengthwise of said first arresting member, said second arresting member including an intermediate portion located out of said path of movement of said projecting section and an end section normally disposed in a first position overlying said recessed portion of said first arresting member and movable therewith into said path of movement; and
   means for biasing said second arresting member relative to said first arresting member into said first position of said second arresting member.

2. Photographic apparatus as defined in claim 1 including means for biasing said first arresting member lengthwise into said initial position thereof.

3. Photographic apparatus as defined in claim 1 wherein said first and second arresting members comprise resilient strips secured in face-to-face relation for limited sliding movement relative to one another.

4. Photographic apparatus as defined in claim 3 wherein said first and second arresting members are sufficiently deformable to permit movement of said end sections apart from one another.

5. Photographic apparatus as defined in claim 1 wherein said first arresting member is supported for lengthwise movement intermediate its ends and said release means are coupled with said first arresting member at its other end.

6. Photographic apparatus as defined in claim 1 wherein said release means are mounted for movement from an arresting position to a release position to move said first arresting member from said initial position and are coupled with said first arresting member for limited movement relative to said first arresting member enabling said release means to return to said arresting position while said first arresting member remains displaced from its initial position.

7. Photographic apparatus as defined in claim 1 wherein said engagement member is mounted for rotation in engagement with said sheet about an axis extending transversely of the direction of movement of said sheet, said projecting section extends radially from said engagement member and said arresting members are movable lengthwise generally parallel with said axis.

References Cited
UNITED STATES PATENTS

| | | | |
|---|---|---|---|
| 3,148,605 | 9/1964 | Peterson et al. | 95—31 |
| 3,232,196 | 2/1966 | Sapp et al. | 95—31 |
| 3,237,542 | 3/1966 | Ataka | 95—31 |
| 3,289,560 | 12/1966 | Eloranza | 95—13 |

NORTON ANSHER, *Primary Examiner.*

ROBERT A. SCHROEDER, *Assistant Examiner.*